May 16, 1933.  O. BERGER  1,909,039
VENDING MACHINE
Filed Nov. 30, 1931   7 Sheets-Sheet 1

Witness:
R. B. Davison

Inventor:
Otto Berger
By Wilson, Bowell, McCanna & Rehm
Attys

May 16, 1933. O. BERGER 1,909,039
VENDING MACHINE
Filed Nov. 30, 1931 7 Sheets-Sheet 2

Witness:
R. B. Davison.

Inventor:
Otto Berger:
By Wilson, Dowell, McCanna & Rehm
Attys

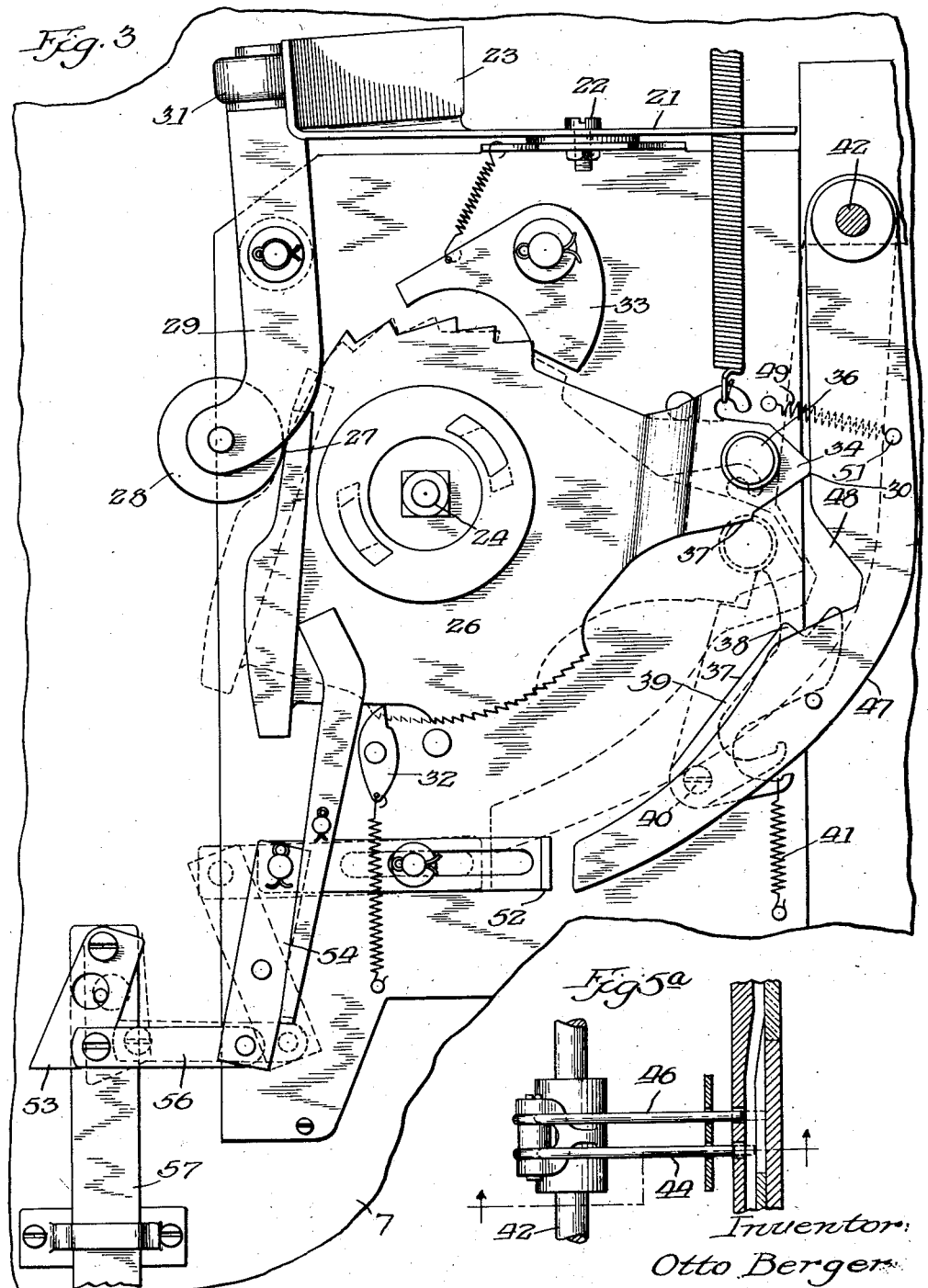

May 16, 1933.  O. BERGER  1,909,039
VENDING MACHINE
Filed Nov. 30, 1931  7 Sheets-Sheet 4
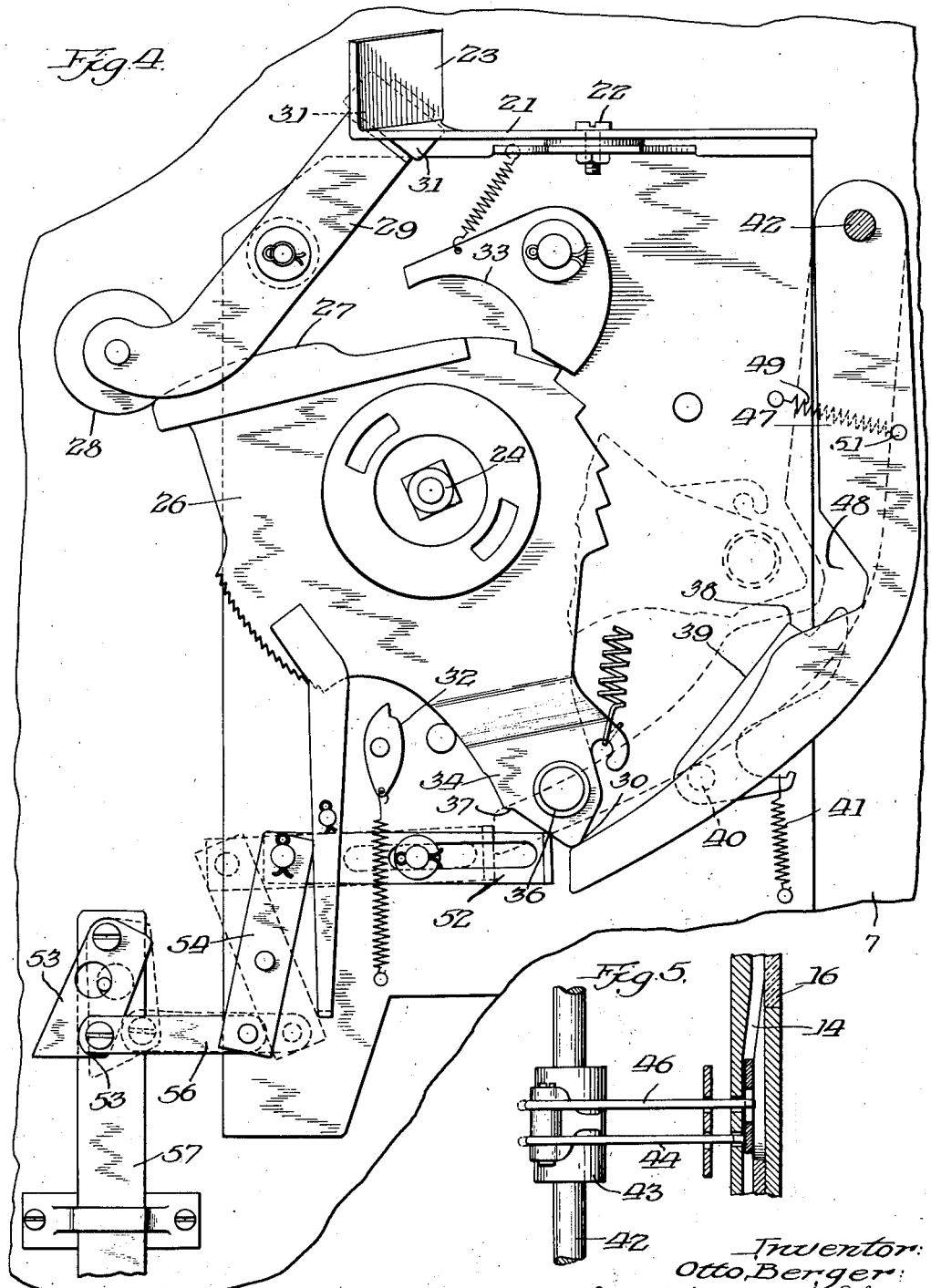

May 16, 1933.  O. BERGER  1,909,039
VENDING MACHINE
Filed Nov. 30, 1931   7 Sheets-Sheet 5
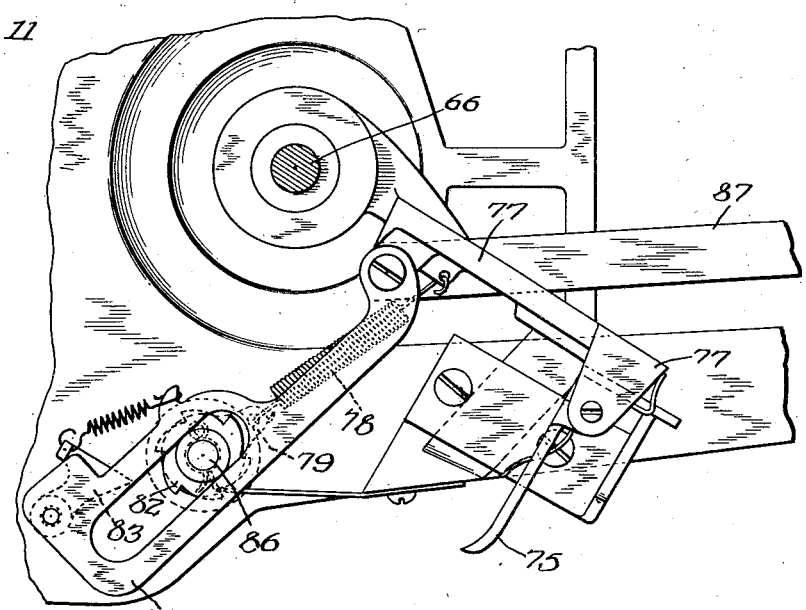
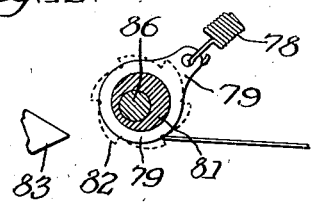
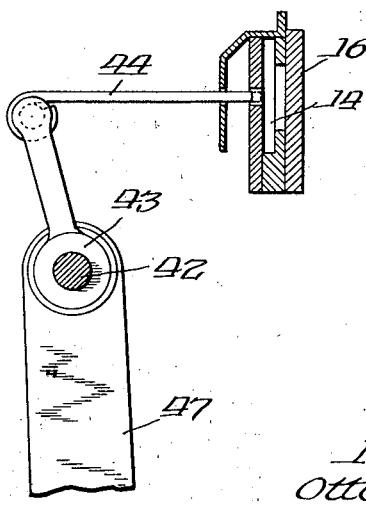

May 16, 1933.  O. BERGER  1,909,039
VENDING MACHINE
Filed Nov. 30, 1931  7 Sheets-Sheet 6
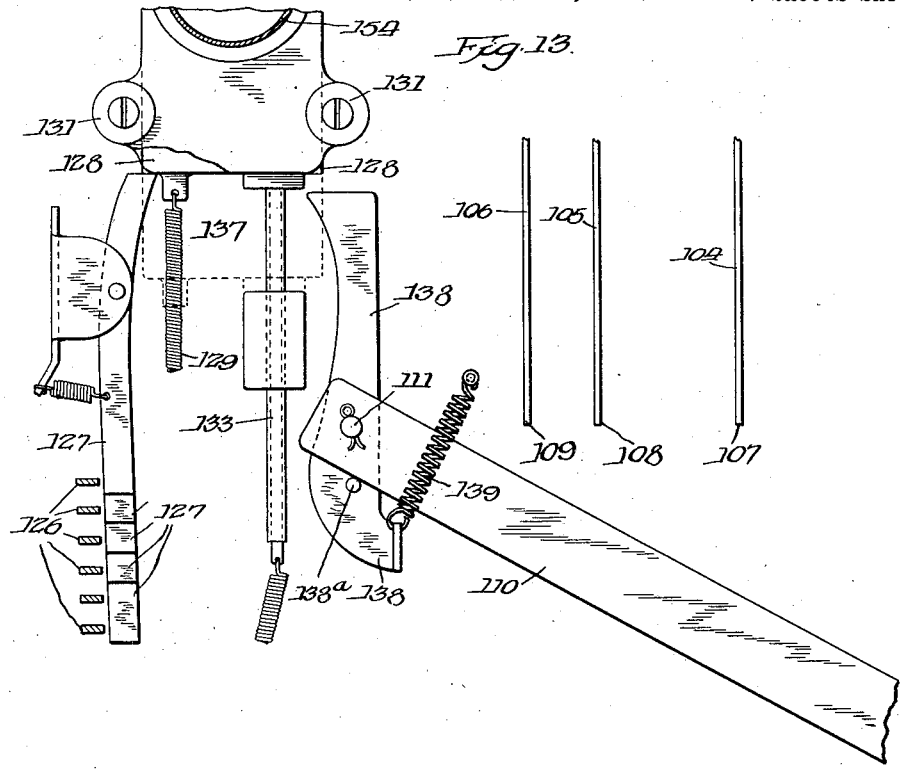
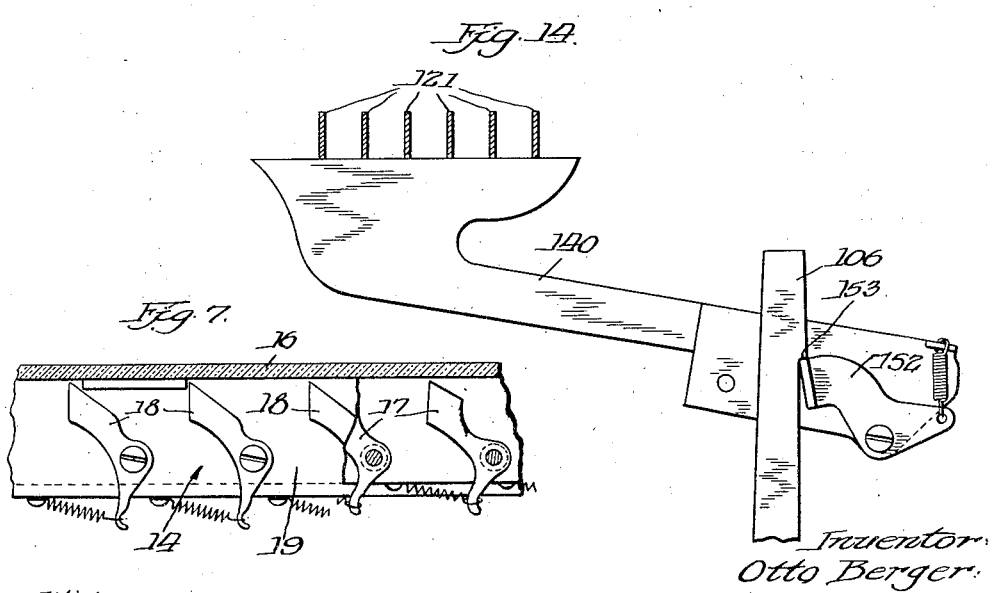
Witness:
R. B. Davison.
Inventor:
Otto Berger.
By Wilson, Dowell, McCanna & Rehm
Attys May 16, 1933.  O. BERGER  1,909,039
VENDING MACHINE
Filed Nov. 30, 1931   7 Sheets-Sheet 7
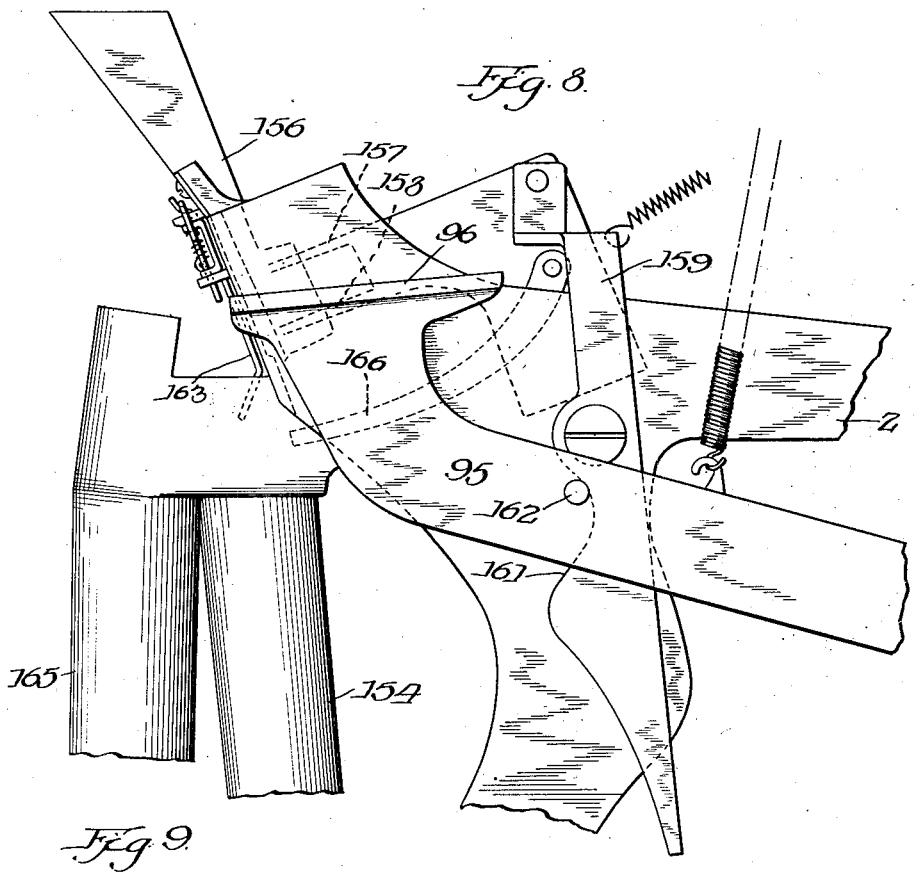
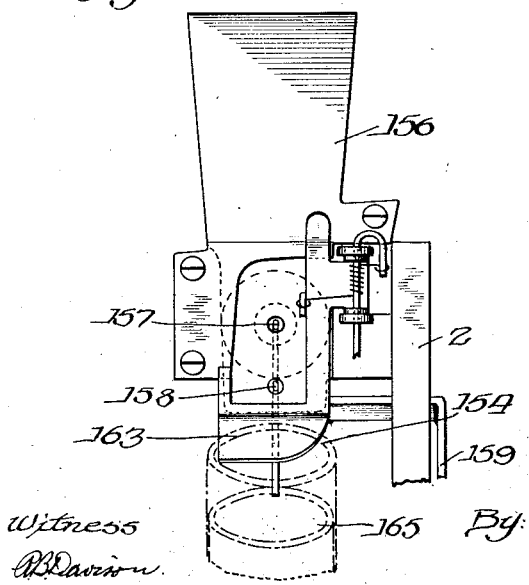
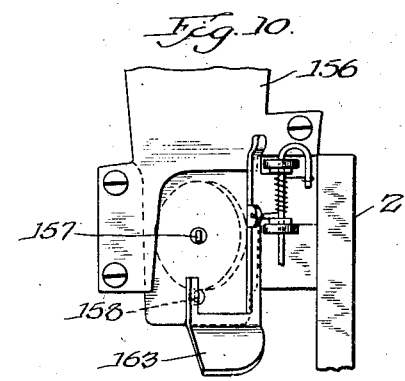
Inventor:
Otto Berger
By Wilson, Dowell, McCanna & Rehm
Att'ys Patented May 16, 1933

1,909,039

UNITED STATES PATENT OFFICE

OTTO BERGER, OF CHICAGO, ILLINOIS, ASSIGNOR TO O. D. JENNINGS & COMPANY, OF CHICAGO, ILLINOIS, A CORPORATION OF ILLINOIS

VENDING MACHINE

Application filed November 30, 1931. Serial No. 577,890.

My invention relates to vending machines and has for its purpose to improve the working parts of such a machine and to incorporate therein an amusement device in the form of a toy or simulated race track which will stimulate and induce the use of the vending machine by providing amusement with the purchase and by giving rewards or prizes in the form of a token as a result of the race and which may be used to operate the machine along with the merchandise being vended. It is also an object of my invention to permit the operation of the amusement device alone by use of the prizes given away by the machine if desired.

In accordance with this invention, means are provided for detecting whether coins or tokens are used and for controlling the machine for different operations in accordance with the results of the detection, i. e., whether a coin or a token is being used. Means are also provided for selectively distributing the coins and tokens used into different receptacles, the tokens being preferably distributed to prize or reward distributing mechanism.

The amusement device is a simulated race track in which the racers are carried by parallel horizontal superposed discs operated from concentric vertical shafts.

Figure 1:
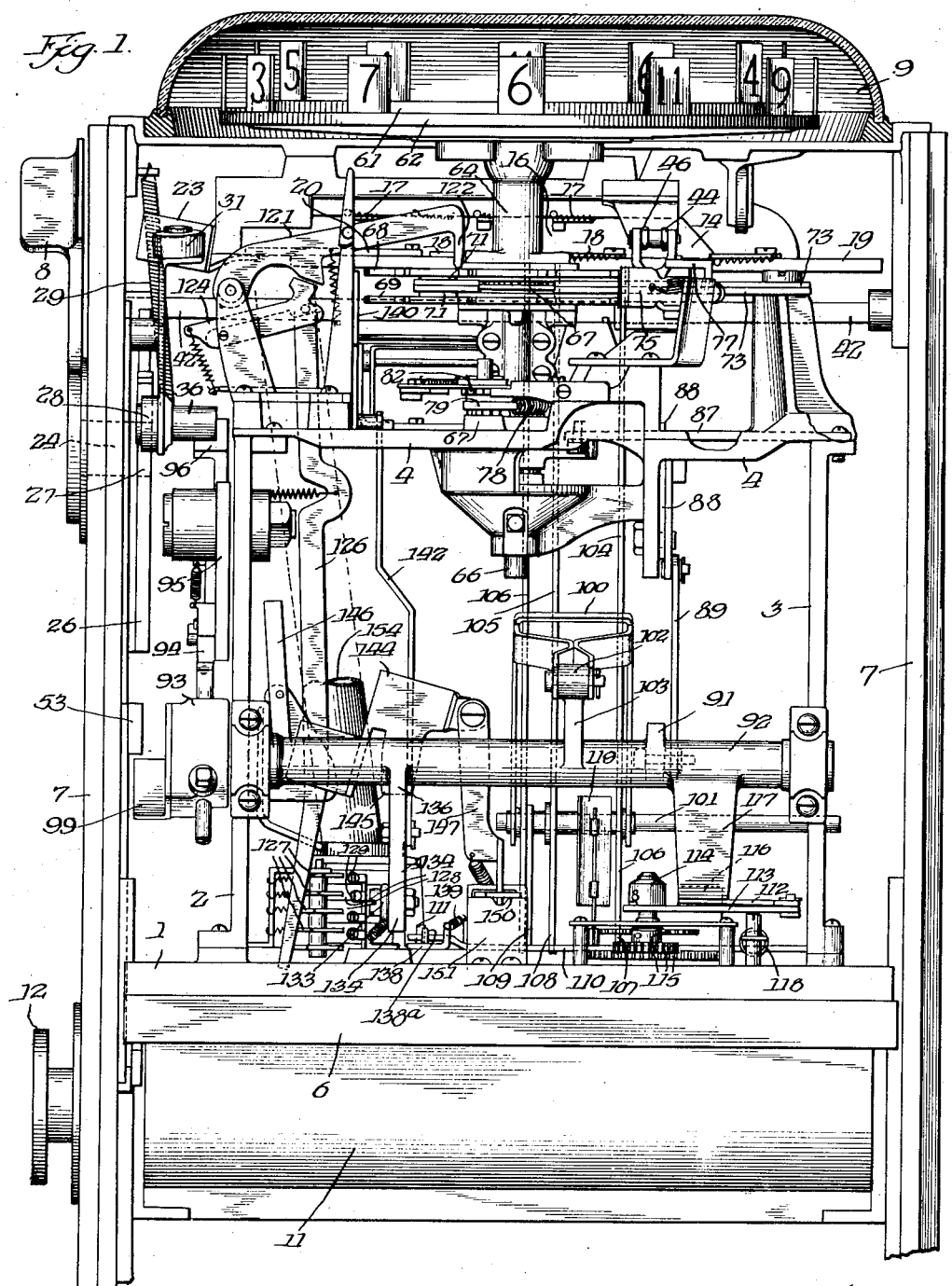
Figure 2:
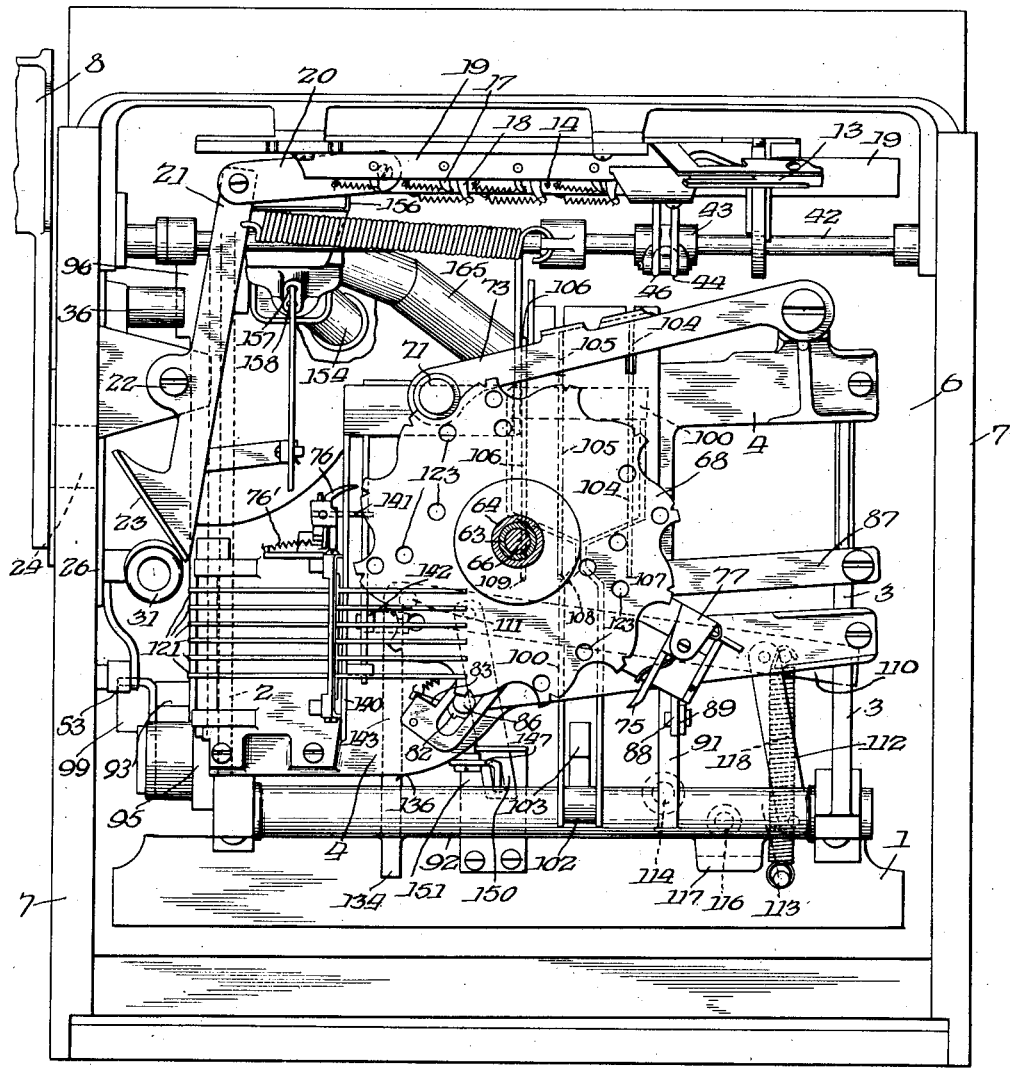

Other new and novel features, such as resetting mechanisms and the provision and arrangement of common actuating shaft for operating or setting into operation the entire mechanism, and other novel features and their resultant advantages will be apparent from the following description given in connection with the drawings, in which:

Fig. 1 is a rear elevation of the complete machine, the glass cover being cut away and the rear wall of the cabinet being removed with certain parts of the coin operating mechanism also omitted for the sake of clearness, Fig. 2 is a plan section taken immediately below the rotary discs carrying the racing characters, that is, immediately below the upper wall of the cabinet, Fig. 3 is an end elevation of the coin controlled actuating mechanism mounted upon the inner surface of the left side wall, as viewed in Fig. 1, and illustrating the actuating mechanism in normal or idle position in full lines, and in locked position in dotted lines such as would be assumed if an attempt were made to operate the machine without inserting a coin or token, Fig. 4 is an elevation similar to Fig. 3 with certain parts omitted for the sake of clearness and illustrating the position of the parts upon actuation when a coin has been used, in full lines, and when a token has been used, in dotted lines, Fig. 5 is an enlarged fragmentary plan view of the detecting fingers with the coin slide in section and illustrates their position in full lines when a token is used and in dotted lines when a coin is used, Fig. 5a is an enlarged fragmentary plan view of the detector fingers with the coin slide in section illustrating their normal or idle position in full lines and their locked position such as when neither coin or token is used, in dotted lines, Fig. 6 is an enlarged fragmentary end elevation of the detecting mechanism showing the fingers in normal or idle position, Fig. 7 is a plan view of the feed dogs in the coin slide, Fig. 8 is a side elevation of the coin and token distributing mechanism, Fig. 9 is a front elevation of the same with the distributing mechanism in one position, Fig. 10 is a similar view with the distributor in its other position, Fig. 11 is an enlarged partial plan view of the mechanism for varying the tension upon the spring for actuating the rotated discs, Fig. 12 is an additional fragmentary section illustrating the eccentric ratchet, Fig. 13 is an enlarged partial plan view of the payout slide latch members and their associated actuating members, Fig. 14 is a partial end elevation of the reset mechanism and latch.

In general, the entire machine is housed within a suitable cabinet provided with a shallow glass dome enclosing the toy race track at the top, the merchandise racks at the front terminating in the dispensing or vending drum at the bottom of the cabinet. The amusement and reward mechanism is carried by a removable skeleton frame structure comprising a bottom plate 1, two upstanding end plates 2 and 3 secured thereto and a top plate 4 and which is slidingly carried upon a bed plate 6 rigidly secured within a cabinet 7.

The amusement device comprises a toy race track having concentric circles of characters illustrated in the present instance for simplicity and convenience by numerals but which may be any other suitable character and usually are toy racing horses or the like, arranged to project upwardly above the top of the cabinet extending through the upper wall thereof and are enclosed by a glass dome or cover 9. (Fig. 1.)

Positioned for display at the front of the cabinet are the usual package dispensing chutes (not shown) which terminate at the lower ends in the delivery drum 11 which may be actuated by a knob 12 upon the outside of the cabinet. The drum is adapted to be rotated when released to deliver a package of merchandise therefrom. Release occurs upon insertion of a proper coin and actuation of operating handle 8 and the resultant operation of the mechanism within the skeleton frame. This type of vending mechanism is shown in the Jennings Patent No. 1,659,878 and need not be described in detail.

The mechanism is adapted to be operated by the handle 8 upon the insertion of a proper coin or token which will set the vending machine into operation and if a coin is used, permit the discharge of a package of merchandise and set the racing characters in operation. Upon the occurrence of a proper combination of the characters at the end of the race a reward in the form of a certain number of tokens may be given or returned by the machine which may be used to operate the toy race course.

Describing first the coin controlling mechanism which is mounted on the cabinet by which the vending machine is operated, it will be seen that at the top of the cabinet near the front there is provided a coin slot 13 into which the coins may be dropped. The slot leads into a coin chute 14 which extends across the front of the machine and is covered at its front by a plate of glass 16 which permits the coins in the machine to be observed. Within the chute are two sets of pivoted feed dogs, (Figs. 2 and 7), an upper stationary set 17 and a lower reciprocatory set 18. The upper set is pivoted to permit passage of the coin to be fed along the chute by the lower set and to prevent return movement of the coins. The lower set is pivoted to permit return movement of the dogs behind the coins. The feed bar 19 carrying the lower set is actuated through a link 20 which is connected to one end of a lever 21, pivoted intermediate its ends at 22 and terminating at its other end in an inclined upturned cam face 23 engaged by an actuating lever as will be later described.

The actuating handle 8 is secured to the outer end of a rock shaft 24 (Figs. 3 and 4) which has secured to its inner end a rocker plate 26 which is provided upon one side with a cam surface 27 which engages a cam roller 28 carried upon the lower end of a lever 29 pivoted intermediate its ends, the upper end of which carries a second cam roller 31 arranged to engage the inclined cam face 23 upon rotation of the handle and rocker plate whereby the lower feed dogs are actuated to feed the coins along the coin chute.

The rocker plate is notched at its bottom edge and is there engaged by a full stroke dog 32 which necessitates the handle being given a full stroke at each operation. The rocker plate is also toothed at its upper edge where it is engaged by a U-shaped safety pawl 33 which prevents the handle from being actuated with undue rapidity. If the handle is "slammed" downwardly, the upper teeth on the rocker plate will kick the U-shaped dog in a counter-clockwise direction and cause the rearmost leg to engage the teeth and lock the rocker plate against further movement. As long as the handle is actuated at a reasonable speed, the safety pawl will not be kicked out far enough to cause the rearmost dog to engage the teeth.

The rocker plate is formed with a projecting arm 34 which carries a laterally projecting roller 36 by means of which the entire mechanism is operated as will later be explained. The rocker plate is provided with a shoulder 37 which contacts a shoulder 38 upon a locking pawl 39 pivoted at its lower end as at 40. The pawl is normally urged in a clockwise direction, that is, to the right as shown in Figs. 3 and 4 by a spring 41 to normally clear the projection 37 but being adapted to be held toward the left to engage the projection upon the rocker plate, by the coin control mechanism.

To the rear of the coin chute and parallel thereto is a detector shaft 42 to which is rigidly secured an arm 43 which carries a pair of detecting fingers 44 and 46, Figs. 2, 5, 5a and 6, which project into the path of the coins at the leading end of the coin chute, finger 44 being longer than finger 46 by an amount approximately equal to the thickness of a coin. At its other end shaft 42 carries an arcuate depending arm 47 which is notched as at 48 and is maintained in engagement with shoulder 30 of rocker plate 34 by a spring 49 attached to the outer end of a pin 51. Upon rocking movement of arm 47 as determined by fingers 44 and 46 simultaneously with rotation of plate 34, arm 43 will carry the locking pawl inwardly so that its shoulder 38 will engage shoulder 37 upon the rocker plate and prevent rotation of the latter. During the movement of rocker plate 26 arm 34 will enter notch 48, thus allowing arm 47 to swing to the left if pins 44 and 46 do not engage a coin or token.

Rotation of shaft 42 and its arm 47 is limited, however, by engagement of detecting fingers 44 and 46 with a coin or token at the entering or leading end of the coin chute. Arm 47 has four possible positions; one as shown in full lines in Fig. 3 which is its normal or idle position when no coin or token is in the coin chute and handle 8 is not actuated; two, its interlocked position shown in dotted lines in Fig. 3, which it assumes when handle 8 is actuated, i. e., rotated downwardly with no coin or token in the chute, at which time projection 37 will engage locking pawl shoulder 38; three, shown in full lines in Fig. 4 which it takes upon operation of handle 8 when a genuine coin is at the leading end of the chute and the longer detecting finger 44 engages the same. In this position arm 47 is held in its extreme right or forward position and permits full rotation of the rocker plate. Fourth, shown in dotted lines in Fig. 4 when an apertured token or slug is at the leading end of the chute, at which time the longer pin passes through the central opening of the token, but the shorter finger engages the marginal edge thereof, permitting only a slight rotation of shaft 42 and an inward or left movement of arm 47, the movement not being sufficient to permit locking pawl 39 to engage the rocker plate. The movement in the latter case is sufficient, however, as it is in the second position, to permit the lower end of arm 47 to engage slide 52 as finger 34 enters notch 48, to withdraw dog 53 through connecting levers 54 and 56 out of the path of a lift member as will later be described. This prevents raising of slide bar 57, which, if raised, will permit rotation of handle 12 to dispense a package of merchandise. When a genuine coin is inserted in the coin chute, however, finger 46 prevents rotation of arm 47 and maintains it out of contact with slide 52.

Having described the coin control and operating mechanism, the amusement and permutation device mounted within the skeleton frame will be described. The amusement feature comprises, in the present instance, a pair of series of racing characters indicated as numerals projecting upwardly from a pair of horizontal discs, (Fig. 1) an upper disc 61 and a lower disc 62 mounted upon vertical concentric shafts 63 and 64 respectively (Fig. 2) supported by an inner stationary shaft 66 which in turn is supported in vertical position by the upper top plate 4. Thrust bearings 67 (Fig. 1) take the thrust of the two concentric shafts. The discs are spun to simulate a race and in the event of a tie, i. e., upon the occurrence of two similar characters at a given point at the finish of the race, the machine will give a reward in the form of one or more tokens which may be used to play the racers.

The outer shaft 64 is provided with a toothed permutation disc 68 and the inner shaft is provided with a similar toothed permutation disc 69 (Figs. 1 and 2). These discs are arranged to be spun and then automatically stopped in various positions which terminate the race by engagement of rollers 71 (Fig. 2) carried upon the ends of levers 73 pivoted to the top plate there being a lever and roller for each disc. The rollers engage the larger teeth formed in the discs and prevent further rotation thereof.

The discs 61 and 62 with their racers thereon are spun by engagement of a dog 75 (Figs. 1, 2 and 9) with smaller teeth cut in the periphery of the disc which teeth are also engaged by a reversely arranged pivoted pawl 76 normally urged into engagement with the teeth by a spring 76' but held out of engagement with the teeth by a lever 76'' actuated by means later to be described. Dog 75 is carried upon the end of an arm 77 pivoted about the stationary shaft 66 and is normally rotated in a clockwise direction, looking upon the top of the machine, by a tension spring 78, (Fig. 1) one end of which is secured to the arm and the other end of which is tied to an eccentric strap 79 (Figs. 11 and 12) which engages an eccentric cam 81 by means of which the tension of the spring is automatically varied at each operation of the machine.

Formed integrally with the eccentric cam is a tooth or ratchet disc 82 which is automatically rotated one tooth at each operation of arm 77 by a pawl 83 carried by a link 84, one end of which is pivoted to arm 77, and the outer end being slotted to pass over the pin 86 constituting the shaft for the eccentric and ratchet. From the foregoing it will be seen that at each movement of arm 77 pawl 83 engages a tooth of the ratchet disc and rotates the eccentric cam, thus varying the tension upon spring 78 at each operation of the machine.

Arm 77 is rotated against the action of spring 78 to cause the latter to spin the discs by a lever 87 (Figs. 1 and 2) carrying a roller upon its inner end and being pivoted on its outer end to the end plate 3. Lever 87 is engaged intermediate its ends by one arm of a bell crank lever 88, the other arm of which is connected by a link 89 to arm 91 carried upon the main actuating shaft 92 journalled at its extremities in the two end plates 2 and 3.

Shaft 92 carries at one end an adjustable projecting arm 93 which is engaged by a dog 13

94 (Fig. 1) carried by an actuating lever 95 pivoted at its end immediately above the dog to the end frame 2. The forward end of the arm is formed to provide an abutment 96 adapted to be engaged by roller 36 carried upon the finger 34 of rocker plate 26. Shaft 92 is also provided with a flanged arm 99 secured to arm 93 and positioned to engage dog 53 to raise the latter and its associated bar 57 to permit discharge of the merchandise, i. e., when dog 53 is not retracted. Depression of handle 8 and rotation thereby of rocker plate 26 will rotate lever 95 about its pivot and cause its dog 94 to engage arm 93 and rotate shaft 92, thus spinning discs 61 and 62 and their corresponding characters.

Stopping of the discs as previously stated is accomplished by levers 73 and their accompanying rollers 71, the latter being normally in engagement with the peripheries of the discs. Rollers 71 and their levers 73 and 74 are forced out of engagement with the peripheries of the discs by an angle arm 100 pivoted at its rear end upon a stationary rod 101 and extending forwardly to a point over the main actuating shaft 92, at which end it carries a cam roller 102 in position to be engaged by a cam 103 carried approximately at the center of shaft 92. Upon rocking movements of shaft 92, cam 103 raises arm 100 to cause its rearmost edge to engage three levers 104, 105 and 106, the first two, namely 104 and 105, of which engage the two levers 73 to withdraw them from engagement with permutation discs 68 and 69. The third lever 106 serves to permit the permutation fingers to drop as will later be described.

The lower ends of levers 104, 105 and 106 extend downwardly and forwardly terminating in feet 107, 108 and 109 respectively which engage a slide or platform 110 which is pivoted at its inner end upon a post 111 and is arranged to slide under the feet when arm 100 swings levers 104, 105 and 106 about their pivots. As platform lever 110 returns to its normal position, the feet 107, 108 and 109 are permitted to drop one at a time, which in turn permit levers 73 with their rollers 71 to engage the peripheries of the permutation discs 68 and 69. Simultaneously with the raising of lever feet 107, 108 and 109, platform 110 is moved thereunder by means of a link 112 pivoted at one end to the platform and at its other end to an arm 113 pivoted upon the shaft 114 of a train of gears 115 known as the clock mechanism. Intermediate its ends arm 113 carries a roller 116 adapted to be engaged by a depending arm 117 formed integrally upon the main shaft 92.

Upon rocking movement of shaft 92 arm 117 will engage roller 116, rotate arm 113, thereby moving platform 110 under lever feet 107, 108 and 109. Platform 10 is returned by a tension spring 118, the movement being slowed down by the clock mechanism which carries a wind vane 119.

The permutation means for determining the return or payout as a result of the possible similar combinations obtainable by the racing characters carried by the discs comprises a set of horizontal permutation levers 121 terminating in depending fingers 122 adapted to drop into apertures 123 formed in the permutation discs 68 and 69. Whenever one or more of these apertures lie beneath the fingers when the discs have been stopped, the finger or fingers thereover will drop therein and depress one or more short horizontal levers 124 (Fig. 1) which will permit outward swinging of vertical levers 126, the lower ends of which engage the projecting ends of latch levers 127 (Figs. 1 and 13) the inner ends of which engage the ends of a series of slides 128, the latter being normally urged outward by springs 129.

The slides are of the usual construction, well-known to those familiar with machines of this type and are provided with circular openings arranged to receive one or more tokens. According to the arrangement or alignment of these openings, one or more tokens will be paid out after selected settings of the characters upon the horizontal disc as determined by the apertures in the permutation discs.

Depending upon which latch levers 127 are engaged by the vertical levers 126 in accordance with the setting of the horizontal levers 121, various slides or combinations thereof may be permitted to be moved outwardly by springs 129 to bring one or more apertures in the slides in alignment, thus depositing or paying out one or more tokens through an aperture formed in the bottom plate 1. The slides are returned to normal position by a rod 133 connected to the depending arm 134 of the bell crank lever 136 formed integrally upon shaft 92. The rod 133 is of sufficient length to engage a push plate 137 formed upon the lowermost slide and extending upwardly to engage the outer ends of the remaining slides. Rocking movement of shaft 92 will move rod 133 horizontally to engage plate 137 and return slides 128 to normal initial position. The push plates and slides are locked in position by a locking pawl 138 pivoted upon post 111 and held normally in front of plate 137 by spring 139 but adapted to be moved out of engagement with plate 137 by platform 110 when the latter is in retracted position by engagement with the latter and engages a pin 138$^a$ projecting from pawl 138.

The horizontal levers 121 are withdrawn from the apertures in the permutation discs by a reset lever 140 (Figs. 1, 2 and 14) pivoted about a horizontal pivot to the top plate 4, the reset lever being disposed beneath the horizontal levers and arranged to pick up the latter. Reset lever 140 is actuated by a vertical rod 142 which also serves to permit dog 76 to move into engagement with the teeth of the permutation discs by moving out of engagement with a finger 141 of the lever carrying the dog and permitting the latter to engage the discs. Rod 142 is pivoted to the outer end of the inwardly projecting arm 143 of bell crank lever 136 formed integrally upon the actuating shaft 92.

The upper edge of arm 143 also engages a rocker arm 144 at 145 (Fig. 1) which swings a U-shaped reset lever 146 which contacts the vertical levers 126 to reset them behind short trip levers 124. Rocker arm 144 has depending therefrom a pivoted latching dog 147 which passes through a slot in a slide bar 150 pivoted to platform 110 and through a bracket 151. Slide bar 150, dog 147 and bracket 151 are so arranged as to engage the dog and hold rocker arm 143 in upward position to retain vertical levers 126 until platform 110 has passed from beneath the lever feet 107, 108 and 109 whereupon slide bar 150 actuated by platform 110 trips and lets dog 147 and rocker arms 143 descend to release levers 126.

Reset lever 140 is provided with a rearwardly projecting arm which carries a spring pressed pawl 152 which engages a shoulder 153 formed in lever 106 and is adapted to be released therefrom when lever foot 109 of lever 106 is disengaged from platform 110.

From the foregoing it can be seen that platform 110 also controls the release of vertical levers 126 through rocker arm 144 and furthermore controls horizontal levers 121 through reset lever 140 and vertical lever 109 so that the permutation members cannot drop and function until the permutation discs have been stopped.

The return or payout slides are filled through a tube 154 which terminates directly above the apertures in the slides and extends upwardly to a point beneath a funnel 156 which receives the coins from the lower end of the coin chute 14. The back wall of the lower end of the funnel is apertured to permit the passage therethrough of two detecting fingers 157 and 158 (Figs. 7 and 8) disposed vertically, the latter finger being longer. The fingers terminate at their rear ends in a plate which is pivoted to the upper end of an angular arm 159 which is pivoted intermediate its ends to the end plate 2 and is provided at its lower portion with a cam surface 161 disposed in the path of movement of a cam pin 162 projecting inwardly from the actuating arm 95. The pin and cam surface are so arranged that the downward movement of actuating arm 95 swings arm 159 in a counter-clockwise direction to project detecting fingers 157 and 158 through the rear wall of the funnel and into the path of descending coins. The lower and longer finger 158 intercepts the passage of coins or tokens. If a solid genuine coin is present, the shorter finger engages the same and pushes it outwardly. Outward movement of the coin is permitted (Fig. 10) by means of a front wall 163 of the lower end of the funnel which is pivoted to permit outward movements thereof. A coin tube 165 extends upwardly from the lower plate of the machine and terminates in a position adjacent the upper end of tube 154 to receive the coins which are deflected outwardly from the funnel.

A finger 166 pivoted to the plate end of fingers 157 and 158 projects across the upper end of tube 154 when fingers 157 and 158 enter into the funnel. Finger 166 serves to prevent coins from entering the tube 154. Should a token be engaged by the detector fingers, the lower one will prevent downward movement of the token, whereas the shorter finger will pass through the aperture in the center of the token and, therefore, will not shove the token outwardly. Upon retracting movement of finger 156 and 157 the token will be dropped down chute 154.

The operation of the entire machine may be summarized as follows:

The operator deposits a coin or token in the coin slide 13 and depresses handle 8. If a coin is inserted the longer detector finger 46 will strike the center of the coin and prevent rocking movement of shaft 42 which in turn will maintain arm 47 in its forward or right position and permit full rotation of rocker plate 26 by operation of handle 8. Furthermore, the lower portion 51 of arm 47 will be held out of contact with slide 52, therefore, dog 53 will not be withdrawn causing bar 55 to be raised to permit rotation of handle 12 to dispense a package of merchandise. If, on the other hand, a token is used, the longer detecting finger 46 will project through the center of the slug as shown in Fig. 5, the shorter finger will contact the margin of the token. Only limited rotation of shaft 42 will occur which in turn will permit the lower end 51 of arm 47 to strike slide 52 and retract dog 53. The limited movement of arm 47, however, will not be sufficient to permit shoulders 37 and 38 to engage, as would be the case if no coin or token were inserted in the coin slide therefore full rotation of rocker plate 26 will take place upon depression of handle 8.

Rotation of rocker plate 26 swings lever 29 and, therefore, lever 21 which actuates the feed bar 17 and feed dogs 18 to convey the coins along the coin chute. The coin at the discharge end of the chute will be dropped into the distributing hopper or funnel 156 where it will be selectively discharged into either of the coin tubes 154 or 165 depending upon whether it is a coin or a token by the selector fingers 157 and 158 which are actuated by engagement of a pin 162 carried by actuating lever 195, the pin engaging lever 161.

Roller 36 projecting from plate 26 engages surface 96 of arm 95 and depresses the latter whereupon dog 94 thereon engages arm 93 on shaft 92 and rocks the latter. The main shaft 92 being the common actuating shaft for substantially all the various mechanisms, sets the entire machine into operation. That is, rotation of shaft 92 raises link 89 which in turn causes dog 75 to engage the discs 68 and 69 to spin the latter and also moves the sliding platform 110 to put the train of gears 115 into operation. Simultaneously, cam 153 carried by shaft 92, engages roller 102 which raises arm 100 thereby raising levers 104, 105 and 106 so that the sliding platform may pass thereunder. As the sliding platform retracts under the action of spring 118 and is retarded by the train of gears and wind vane, the lower portions 108, 109 and 110 of levers 104, 105 and 106 drop off the platform and permit locking rolls 71 to engage permutation discs 68 and 69 to stop the spinning thereof. At each spinning operation of the discs the tension of actuating spring 78 is varied through the medium of the eccentric 81 as previously described. The discs having been spun and stopped, the permutation fingers 121 are allowed to drop by reason of lever 106 being disengaged from locking pawl 152 which allows reset lever 140 to drop (Fig. 14) the latter having been previously raised by rocking of shaft 92 and its actuation of rod 142.

If the depending fingers of one or more of levers 121 have dropped into apertures in the permutation discs, one or more of the vertical levers 126 will be tripped and will strike one or more of latch levers 122 which in turn will permit slides 128 to pay out a reward. If, on the other hand, no aperture in disc 68 lies under any depending finger of levers 121, levers 126 will not be tripped and consequently latch levers 127 will not be moved and there will be no reward.

The main actuating shaft 92 also resets the vertical levers 126 through arm 144 and reset lever 146. The slides 127 are returned to normal position by means of rod 133 actuated from the lever 134 projecting from shaft 92. The slides are latched in returned position by a rocking pawl 138 actuated by sliding platform 110.

It follows from the foregoing description that a simulated or toy race track has been provided and associated and combined with a vending machine in such a manner as to induce the use of the vending machine and thereby increase the sales thereof. The entire mechanism is controlled by a coin operated and controlled mechanism in such a manner relatively to the vending machine and the amusement device thereof that upon use of a coin the vending machine and amusement device may be operated, but upon the use of a token or reward given out by the machine the amusement device only may be played. The giving of rewards may be determined by any selected arrangement of permutation discs and the apertures formed therein which cooperate with the permutation levers so that upon predetermined selected positions of the racers at the termination of the race, one or more tokens may be given to the operator. The racing characters are carried by superposed horizontal discs in such a manner as to simulate an actual race, the discs being driven by concentric vertical shafts.

It will be apparent to those skilled in the art that many variations may be made in the details of the construction without departing from the spirit and scope of the invention as defined in the claims appended hereto.

I claim:

1. In a coin controlled vending machine and amusement device, the combinaton of a coin mechanism, a merchandise dispenser controlled thereby, with a simulated race course including a plurality of horizontal superposed rotary discs, vertical concentric shafts for rotating said discs, racing characters carried by said discs, means for rotating said shafts and permutation means for stopping said discs, said race course being controlled by said mechansm, and means for dispensing prizes in accordance with the positions of the racing characters at the finish of the race.

2. In a coin controlled vending machine and amusement device, the combination of a coin mechanism, a merchandise dispenser controlled thereby, with a simulated race course including a plurality of horizontal superposed rotary discs, vertical concentric shafts for rotating said discs, racing characters carried by said discs, means for rotating said shafts, means for varying the propelling force of said latter means, and permutation means for stopping said discs, said race course being controlled by said mechanism, and means for dispensing prizes in accordance with the positions of the racing characters at the finish of the race.

3. In a coin controlled vending machine and amusement device, the combination of a coin controlled mechanism, a merchandise dispenser controlled thereby, with a simulated race course also controlled by said mechanism, said race course including racing characters, spring means for actuating said racing characters, and means operable by said mechanism for varying the tension of said spring after an operation thereof.

4. In a coin controlled vending machine and amusement device, the combination of a coin mechanism, a merchandise dispenser controlled thereby, with a simulated race course also controlled by said mechanism, said race course including racing characters, spring means for actuating said racing characters, means operable to automatically vary the tension of said spring after certain operations thereof, and means for dispensing prizes in accordance with the positions of the racing characters at the finish of the race.

5. In a coin controlled vending machine and amusement device, the combination of a coin mechanism, a merchandise dispenser controlled thereby, with a simulated race course including racing characters movable in a horizontal plane also controlled by said mechanism, said coin controlled mechanism including a plurality of detecting fingers projecting into the coin chute thereof and means responsive to said fingers for controlling the actuation of said dispenser and said amusement device in accordance with the character of the coin in the coin chute.

6. In a coin controlled vending machine and amusement device, the combination of a coin mechanism, a merchandise dispenser controlled thereby, with a simulated race course including racing characters also controlled by said coin mechanism, said latter mechanism includng a detector shaft, detecting fingers carried thereby and means actuated by said shaft for controlling the operation of said dispenser and said racing characters.

7. In a coin controlled vending machine and amusement device, the combination of a coin mechanism, a merchandise dispenser controlled thereby, with a simulated race course including racing characters also controlled by said coin mechanism, said latter mechanism including a plurality of detecting fingers of different lengths projecting into the coin chute thereof and means responsive to said fingers for controlling the actuation of said dispenser and said amusement device in accordance with the character of the coin in the coin chute.

8. In a coin controlled vending machine and amusement device, the combination of a coin mechanism, a merchandise dispenser controlled thereby, with a simulated race course including racing characters also controlled by said mechanism, said coin mechanism including a detector shaft, detecting fingers carried thereby and means actuated by said shaft for controlling the operation of said dispenser in accordance with the character of the coin in the coin mechanism.

9. In a coin controlled vending machine and amusement device, the combination of a coin control mechanism, a merchandise dispenser controlled thereby, with a simulated race course including racing characters also controlled by said mechanism, said coin mechanism including a detector shaft, detecting fingers carried thereby and arranged to control the rotation of said shaft in accordance with the character of the coin being used, and means responsive to the position of said shaft for controlling the operation of said dispenser.

10. In a simulated race course, a plurality of rotatable racing characters, shafts for rotating said characters, spring actuated means for rotating said shafts, means actuated by operation of the race course for varying the tension of the spring of said actuating means, permutation means for stopping said characters to terminate the race, and coin controlled mechanism for controlling the operation of said course.

11. In a simulated race course, a plurality of rotatable racing characters, shafts for rotating said characters, spring actuated means for rotating said shafts, means actuated by operation of the race course for varying the tension of the spring of said actuating means, permutation means for stopping said characters to terminate the race, means for dispensing prizes in accordance with the positions of the racing characters at the finish of the race and coin controlled mechanism for controlling the operation of said course.

12. In a coin controlled vending machine and amusement device, the combination of a coin mechanism, including a coin chute, a feed bar having pivoted feed dogs thereon, means for reciprocating said bar to convey coins along the chute, a second set of pivoted dogs arranged to prevent return movement of the coins during retraction of the feed dogs, and a plurality of associated detecting fingers projecting into said chute to determine the character of coin therein, a merchandise dispenser controlled by said mechanism in response to the determination of said detecting fingers.

13. In a coin controlled vending machine and amusement device, the combination of a coin mechanism, including a coin chute, a feed bar having pivoted feed dogs thereon, means for reciprocating said bar to convey coins along the chute, a second set of pivoted dogs arranged to prevent return movements of said coin during retraction of the feed dogs, and a plurality of associated detecting fingers projecting into said chute to determine the character of coin therein, a merchandise dispenser controlled by said mechanism in response to the determination of said detecting fingers, and an amusement device also controlled by said mechanism.

14. A coin controlled vending machine and amusement device having in combination a coin mechanism, an actuating lever for operating said machine controlled thereby, said coin mechanism including a coin chute, a distributing funnel having a hinged front wall arranged to receive coins from said chute and selecting means associated with said funnel and operative to selectively move said wall to distribute the coins fed thereinto in accordance with the character of the coin, a merchandise dispenser controlled by said coin mechanism, and a simulated race course including racing characters also controlled by said coin mechanism.

15. In a coin controlled vending machine and amusement device, the combination of a coin mechanism, a merchandise dispenser controlled thereby, with a simulated race course including racing characters also controlled by said coin mechanism and permutation means for dispensing prizes in accordance with the position of the racing characters at the finish of the race, said latter means including a plurality of levers and associated permutation discs, a sliding platform means for resetting said levers and a latch under control of said platform for disengaging said resetting means.

16. In a coin controlled vending machine and amusement device, the combination of a coin mechanism, a merchandise dispenser controlled thereby, with a simulated race course including racing characters also controlled by said coin mechanism and permutation means for dispensing prizes in accordance with the position of the racing characters at the finish of the race, said latter means including a plurality of levers and associated permutation discs, means for spinning said discs, means for stopping said discs, a second set of levers for controlling said stopping means, a sliding platform for controlling said latter levers, prize dispensing slides controlled by said first mentioned levers and means actuated by said platform for releasing said slides.

17. In a coin controlled vending machine and amusement device, a coin controlled actuating mechanism, a shaft actuated thereby, a merchandise dispenser controlled by said shaft, and a simulated race course having racing characters, means for spinning said characters, means for stopping said characters to terminate the race, means for retracting said stopping means, a sliding platform cooperative with said retracting means to maintain said stopping means in retracted position for a limited period, and thereafter automatically releasing said retracting means, a cam upon said shaft for actuating said retracting means and means connecting said shaft to said spring means to operate the latter from said shaft.

In witness of the foregoing I affix my signature.

OTTO BERGER.